United States Patent
Yang et al.

[11] Patent Number: 5,361,910
[45] Date of Patent: Nov. 8, 1994

[54] MODIFIED MINERAL JIG

[75] Inventors: Wen-Ching Yang, Murrysville; David C. Grant, Gibsonia, both of Pa.

[73] Assignee: Westinghouse Electric Corporation, Pittsburgh, Pa.

[21] Appl. No.: 67,190

[22] Filed: May 26, 1993

[51] Int. Cl.⁵ .............................................. B03B 5/12
[52] U.S. Cl. ...................................... 209/13; 209/425
[58] Field of Search ................... 209/12, 13, 44, 425, 209/427

[56] References Cited

U.S. PATENT DOCUMENTS

| | | | |
|---|---|---|---|
| 1,461,647 | 7/1923 | Bookwalter | 209/425 |
| 1,651,046 | 11/1927 | Steel | 209/425 |
| 2,100,459 | 11/1937 | Ware | 209/425 |
| 3,801,370 | 4/1974 | Porter et al. | 209/13 X |
| 4,646,978 | 3/1987 | Johnson et al. | 241/24 |
| 4,762,280 | 8/1988 | Prisco et al. | 241/3 |
| 4,783,253 | 11/1988 | Ayers et al. | 209/2 |
| 4,783,263 | 11/1988 | Trost et al. | 210/638 |
| 4,955,403 | 9/1990 | Zappa et al. | 134/109 |
| 5,128,068 | 7/1992 | Lahoda et al. | 252/626 |

FOREIGN PATENT DOCUMENTS

| | | | |
|---|---|---|---|
| 1167761 | 1/1963 | Germany | 209/425 |
| 1209624 | 10/1970 | United Kingdom | 209/425 |
| 1286298 | 1/1987 | U.S.S.R. | 209/13 |

*Primary Examiner*—D. Glenn Dayoan
*Assistant Examiner*—Tuan N. Nguyen
*Attorney, Agent, or Firm*—Daniel P. Cillo

[57] ABSTRACT

The present invention provides an improved design for the hindered settling bed within a mineral jig. The hindered settling bed contains relatively low density materials that can be used in conjunction with high density materials to aid in the separation of particulate materials within the mineral jig. The presence of the relatively low density barrier materials in the settling bed allow for the separation to occur with less channelling of the separated material through the bed area.

9 Claims, 1 Drawing Sheet

MODIFIED MINERAL JIG

FIELD OF THE INVENTION

The present invention relates to mineral jigs used for the separation of particulate materials. More specifically, the present invention relates to an improved hindered settling bed design for a mineral jig.

BACKGROUND OF THE INVENTION

Mineral jigs are gravitational concentrators used widely in the mining industry to separate the mineral from the gangue material based on density differences in the separated materials. Mineral jigs have recently been used in soil decontamination processes such as those set forth in U.S. Pat. No. 5,128,068 to Lahoda et al., assigned to the assignee of the present invention, and which is incorporated herein in its entirety.

The operation of a mineral jig can either be in cocurrent or countercurrent mode. The countercurrent mode, as taught in U.S. Pat. No. 5,128,068 is typically preferred for soil decontamination. In the countercurrent mode, the material to be separated is fed as a slurry into the top section of the jig and the material then flows into the hindered settling bed. A rinsing solution is fed into the bottom of the jig and this solution flows within the jig in an upward fashion. The hindered settling bed conventionally contains a layer of heavy particulate aggregate material, called "ragging" that rests upon a supporting grate. The ragging is commonly composed of gravel or a stone mixture. A layer or plurality of layers of balls, such as steel, glass, or ceramic balls, is also frequently used in the bed area to aid the separation process. The heavier particulate material in the feed slurry penetrates through the ragging and the grate, flows counter to the rinse solution, and is withdrawn as a concentrate from the bottom of the jig. The lighter gangue is carried out of the top of the jig with the rinse solution as overflow material. The separation in the jig is facilitated by imparting a high frequency pulse/suction flow between 200 to 300 Hz to the solution within the jig below the bed. This pulse/suction flow is commonly imparted by use of a diaphragm.

The current operation of the jig under these conditions suffers from various process problems. Coarser particles which are to be separated can have densities similar to or lighter than the bed ragging and dense ball layer, and thus have a difficult time traversing these materials.

A particular problem is adjusting the aggregate ragging coupled with the ball material layer and the jig stroke length to achieve adequate separation. If the depth of the ragging materials is too great, then a longer stroke length is required to disrupt this bed to allow separation. However, the longer stroke length tends to disrupt the bed in such a way that the ragging repositions itself and channeling problems arise. This channelling can usually only be detected by monitoring the exit streams and thus is not detected immediately. If the stroke length is too short, the heavier, larger particles will not penetrate through the bed, resulting in the bed becoming packed and process flooding can occur with most of the material being carried away in the overflow. If the depth of the ragging materials is decreased, then the separation efficiency between the particulate materials decreases.

A need therefore exists to design an improved mineral jig for the separation of feed materials. The jig design should provide for a hindered settling area that aids in the separation of the heavy and gangue particulate materials without the problems of channelling or flooding within the bed area.

SUMMARY OF THE INVENTION

The present invention provides an improved mineral jig that has a hindered settling bed for enhancing the separation of the particulate feed materials. The mineral jig contains the hindered settling bed located between an upper and a lower outlet. The bed contains low density barrier material that has a density of less than 1.8 g/cm$^3$. The particle size of the low density barrier material is such that it is retained on a screening sieve having a nominal sieve opening of about 2.0 mm (0.08 inches).

The density of the low density barrier material is preferably from about 0.7 to about 1.6 g/cm$^3$, and more preferably from about 0.85 to about 1.4 g/cm$^3$. The particle size is preferably such that the material is retained on a screening sieve having a nominal sieve opening of about 4.8 man (0.18 inches).

DETAILED DESCRIPTION OF THE INVENTION

The present invention relates to an improved design for a mineral jig. The mineral jig is outfitted with an improved hindered settling bed that contains relatively low density barrier materials to aid in the separation of variously sized particulate materials based upon their size and density.

Figure 1:
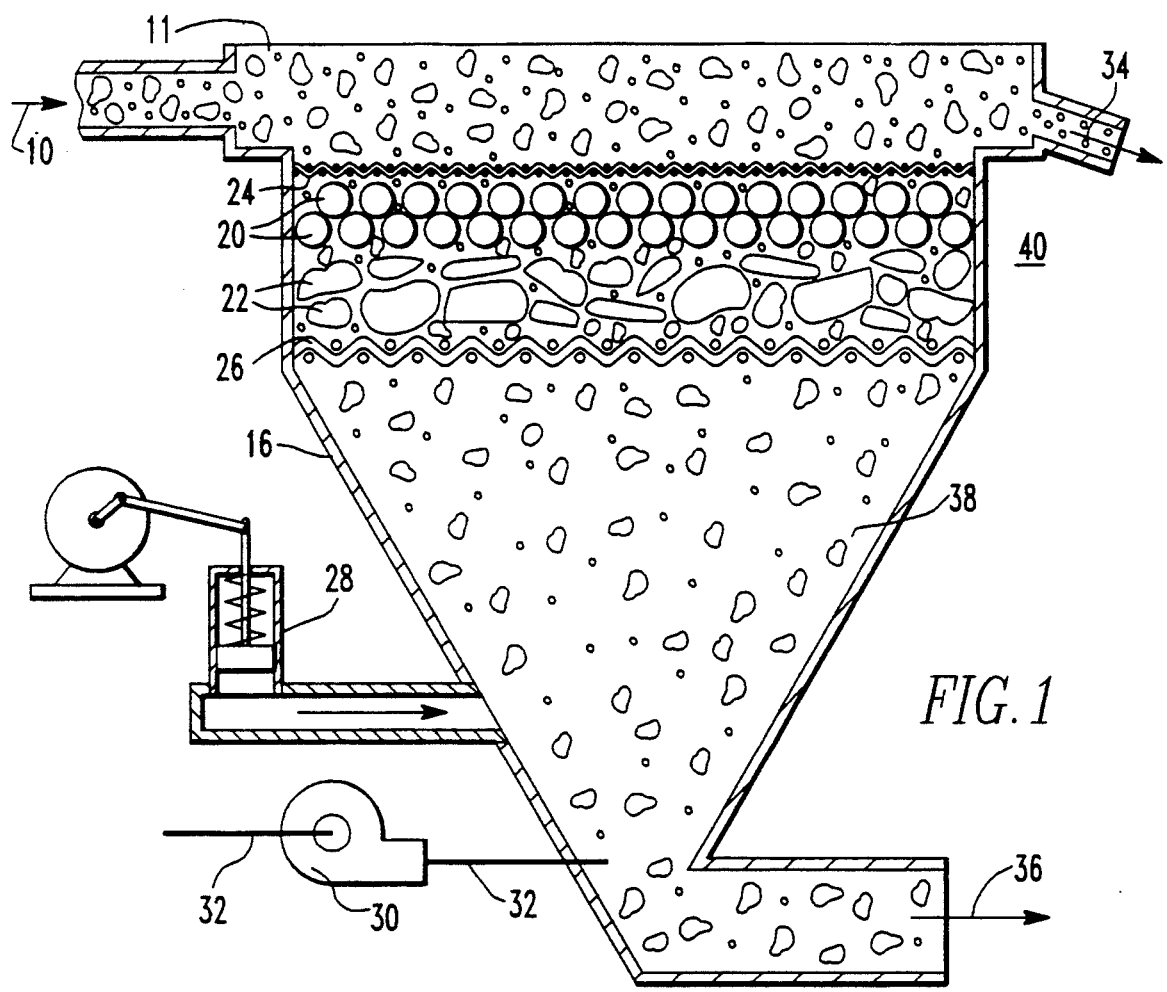
FIG. 1 is a cut-away view of the mineral jig of the present invention.

The invention is described with reference to FIG. 1 which shows a cross-sectional view of a mineral jig 16. Such mineral jigs are well known and described in, for example, U.S. Pat. No. 5,128,068 to Lahoda et al., which is herein incorporated by reference in its entirety. The mineral jig 16 can be operated in either a cocurrent or countercurrent mode, and the preferred countercurrent mode is set forth in FIG. 1.

Contaminated waste material which can include such materials as soil, sand, sludge, sediments, scrap yard dust, but preferably contaminated soil, is fed into the upper portion 11 of the jig 16. The soil can be generally characterized as containing light particles 12 and heavy particles 14. The light particles 12 generally have a smaller particle size than the heavy particles 14 and consequently generally weigh less also. The soil is carried into the jig 16 via line 10 and is suspended in a liquid to form a feed slurry.

The operation of the jig 16 is such that the light particles 12 are separated from the heavy particles 14 to a certain extent. To accomplish this separation, a rinse solution is pumped into the jig 16 via line 32 by pump 30. The rinse solution is fed into the lower portion 38 of the jig 16. A superimposed pulsing flow is applied to the slurry within the jig 16 by means of a diaphragm 28 operated at a specified frequency and pulse stroke length to aid in the separation. The rinse solution carries the lighter particles 12 out of the upper portion 11 of the jig 16 via line 34. The heavy particles 14 migrate past the upward flowing rinse solution within the jig 16 and are collected near the lower portion 38 of the jig 16 and removed via line 36 as a cleaned soil.

The jig 16 is conventionally outfitted with a hindered settling bed. The bed is supported within the jig 16 by a grate 26. Generally, a layer of aggregate material 22, such as gravel, stones, or balls made of such materials as steel, glass, or ceramic, is used to aid in the particle separation. These aggregrate materials 22 have a density of about 2 g/cm$^3$ and higher.

Figure 2:
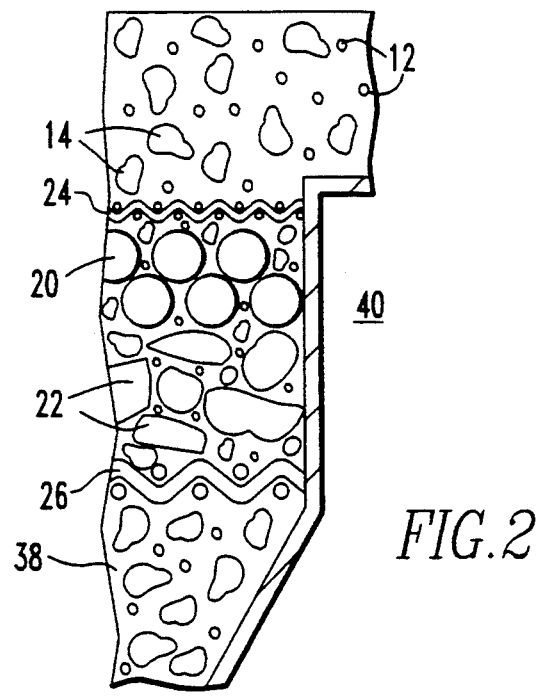
FIG. 2 is a sectional view of the hindered settling bed within the mineral jig of the present invention.

The bed section 40 of the hindered settling bed of the present invention, as shown in more detail in FIG. 2, is provided with a layer of less dense barrier material 20. This bed material has a density of below about 1.8 g/cm$^3$, preferably from about 0.7 to about 1.6 g/cm$^3$, and more preferably from about 0.85 to about 1.4 g/cm$^3$. This lower density barrier material 20 allows for improved separation of the light particles 12 and the heavy particles 14 with a decreased pulse stroke length.

The barrier material 20 can commonly be made from polymeric and plastic materials which can either be solid or hollow. The barrier material 20 can also be made from other materials having a density outside the specified range as a hollow material with the overall density of the material in the specified range. The preferred shape of the barrier material 20 is spherical, however any shape of the material can be used.

The lower density barrier materials 20 of the present invention are preferable contained within the bed as a multiple layer, however a monolayer can be used. The lower density barrier materials 20 can also be used in conjunction with an aggregate bed material 22 in the bed. Another embodiment of the invention is to use a mixture of the lower density barrier materials 20 along with higher density, that is above about 2.0 g/cm$^3$ steel glass ceramic, or high density polymeric materials in the bed. The overall effect of using the lower density materials is that the pulse stroke length can be decreased while maintaining the level of separation of the feed materials. The problems with channelling in the bed are decreased by using the lower density materials since they tend to settle into a uniform layer during operation and are not dislodged into regions giving rise to channelling as with the heavier aggregrate and other ragging materials. The volume of the hindered settling bed barrier materials that is the lower density barrier materials 20 is generally at least about 25 percent by volume, preferably from about 25 to about 85 percent by volume, and more preferably from about 35 to about 75 percent by volume.

The lower density barrier materials 20 must have a particle size such that they do not migrate through the bed and the grate 26. Thus, the barrier materials 20 have a particle size that is larger than the grate openings. In practice the particle size of the barrier material 20 is such that it is retained on a screening sieve having a nominal sieve opening of about 2.0 mm (0.08 inches), preferably a nominal sieve opening of about 4.8 mm (0.18 inches), and more preferably the barrier materials 20 have an average diameter of greater than about 4.8 mm (0.18 inches). As those skilled in the art know, the grate openings can be larger, and some openings can be as large as about 12.5 mm (0.5 inches), in which case the lower density barrier materials would be selected to have a particle size greater than about that size.

In one embodiment of the present invention the barrier material 20 has a density below 1.0 g/cm$^3$. These barrier materials can either be placed below the grate 26 or in the normal position between the grate 26 and the screen 24.

We claim:

1. An improved mineral jig having a hindered settling bed, comprising:
    (a) a mineral jig comprising an inlet, an upper outlet and a lower outlet; and
    (b) density separation means comprising a hindered settling bed located between the upper outlet and the lower outlet, the bed comprising two different materials having different densities, including a multiple layer of individual particles of a low density barrier material having a density of less than 1.8 g/cm$^3$, and a particle size such that the low density barrier material would be retained on a screening sieve having a nominal sieve opening of about 0.08 inch (2.0 mm).

2. The mineral jig of claim 1 wherein the low density barrier material comprises spherical balls having an average diameter of greater than about 0.18 inches. (2.8 mm).

3. The mineral jig of claim 1 wherein the low density barrier material comprises material having a density of from about 0.7 to about 1.6 g/cm$^3$.

4. The mineral jig of claim 1 wherein the low density barrier material comprises material having a density of from about 0.85 to about 1.4 g/cm$^3$.

5. The mineral jig of claim 1 further comprising a support located proximate to the bottom of the hindered bed for supporting the bed, and a screen located proximate to the top of the hindered bed for enclosing the bed.

6. The mineral jig of claim 5 further comprising a high density barrier material layer located within the hindered bed and between the support and the low density material, the high density barrier material having a density of at least 2.0 g/cm$^3$.

7. The mineral jig of claim 6 wherein the high density barrier material comprises gravel.

8. The mineral jig of claim 6 wherein the high density barrier material comprises at least one material selected from the group consisting of glass, ceramic, and metallic material.

9. The mineral jig of claim 6 wherein the high density barrier material has a density of at least about 3 g/cm$^3$ and the low density barrier material has a particle size such that the material is retained on a screening sieve having a nominal sieve opening of about 0.18 inches (4.8 mm).

* * * * *